United States Patent [19]

Smith

[11] Patent Number: 5,573,290
[45] Date of Patent: Nov. 12, 1996

[54] HYDRAULIC CYLINDER RETAINER

[76] Inventor: Edward J. Smith, 101 Maple Ave., Asbury, N.J. 08802

[21] Appl. No.: 111,704

[22] Filed: Aug. 25, 1993

[51] Int. Cl.$^6$ .............................. E05C 17/44; B25G 3/00
[52] U.S. Cl. .......................... 292/338; 403/344; 403/362
[58] Field of Search ................................ 292/338; 16/49, 16/66, 82, 84, 85, DIG. 17; 403/3, 4, 344, 362, 381

[56] References Cited

U.S. PATENT DOCUMENTS

| | | | |
|---|---|---|---|
| 3,113,479 | 12/1963 | Swingle | 403/362 X |
| 3,353,852 | 11/1967 | Wood | 403/3 X |
| 3,445,130 | 5/1969 | Obenshain | 403/344 |
| 3,588,152 | 6/1971 | Shomo | 403/344 |
| 3,955,828 | 5/1976 | Boudreau | 403/362 X |
| 3,977,712 | 8/1976 | Northrop | 292/338 |
| 4,035,098 | 7/1977 | Griffin | 403/362 X |
| 4,090,796 | 5/1978 | Okuda et al. | 403/381 X |
| 4,217,061 | 8/1980 | Eiland et al. | 403/344 X |
| 4,251,165 | 2/1981 | Forsen | 403/362 X |
| 4,472,005 | 9/1984 | Norton, II | 403/362 X |
| 4,557,470 | 12/1985 | Link | 403/344 X |
| 4,589,622 | 5/1986 | Hutter | 403/362 X |
| 4,594,752 | 6/1986 | Garner, Sr. | 403/3 X |
| 4,596,383 | 6/1986 | Howard | 267/64.12 |
| 4,723,053 | 2/1988 | Amaya | 403/344 X |
| 4,815,163 | 3/1989 | Simmons | 16/49 |
| 4,824,082 | 4/1989 | Schaupp | 292/338 X |
| 4,925,230 | 5/1990 | Shelton | 292/338 X |
| 5,024,303 | 6/1991 | Kosloff | 403/362 X |
| 5,039,043 | 8/1991 | Hodge | 403/362 X |
| 5,073,074 | 12/1991 | Corrigan et al. | 403/362 X |
| 5,085,535 | 2/1992 | Solberg et al. | 403/344 X |
| 5,149,109 | 9/1992 | Jelinek et al. | 403/381 X |
| 5,203,114 | 4/1993 | Orlando | 49/386 |
| 5,238,213 | 8/1993 | Pool | 292/338 X |

FOREIGN PATENT DOCUMENTS

8781  5/1893  United Kingdom .................. 403/381

Primary Examiner—Steven N. Meyers
Assistant Examiner—Suzanne L. Dino

[57] ABSTRACT

This is a retaining device for locking pistons that have retractable sliding arms. The retaining device has a first ring portion having interior, exterior, and two end surfaces with screw receiving areas. A receiving area for a holding screw extends from the interior surface to the exterior surface of the first ring portion. A second ring portion also has interior, exterior, and two end surfaces with screw receiving areas. The ring portions are assembled through use of screws to form a collar. A holding screw with a handle, sized to be threaded into the receiving area of the first ring portion, locks the retaining device onto the piston arm.

2 Claims, 11 Drawing Sheets

NEW GAS PROP
PERFORMANCE vs. TEMPERATURE

Fig. 17

PERFORMANCE vs. TEMPERATURE
5 YR. OLD MARGINAL GAS PROP

Fig. 18

PERFORMANCE vs. TEMPERATURE
10 YR. OLD BAD GAS PROP

HYDRAULIC CYLINDER RETAINER

BACKGROUND OF THE INVENTION

1. Field of the Invention

The instant invention relates to an easy-to-use locking device for use with hydraulic pistons.

2. Brief Description of the Prior Art

Conventional automotive vehicle bodies have closures, such as hoods, deck lids, or tail gates, which are swingably supported on the vehicle body for movement between open and closed positions. It is also conventional to provide an extendible and collapsible support strut or hold-open device to hold the closure in its open position. These devices can be either mechanical, pneumatic, or a combination thereof.

One type of mechanical device utilizes a pair of telescoping members that are respectively connected to the closure and vehicle body, and which are urged toward an extended position by a spring to hold the closure in its open position. In such devices the spring force has to be overcome to collapse the telescoping members when the closure is moved to its closed position. Examples of such devices are shown in U.S. Pat. Nos. 4,512,600; 3,319,993; 3,891,111; 3,611,892; and 3,851,908. Pneumatic hold-open devices, such as gas spring struts, etc. operate in much the same manner. Examples of such devices are shown in U.S. Pat. Nos. 3,883,126; 3,977,712; and 4,307,875.

The gas springs, or hydraulic pistons, are commonly used in pivoting a trunk lid, hatch-back of an automobile, or rear door of a mini-van, between open and closed positions. The gas springs are subject to wear, leakage, and temperature. A gas spring which, when new, will reliably have a lift in excess of 30 lbs., will, over time, lose its lift capability in colder temperatures. Additionally, over time, the gas will leak out completely, causing failure in all temperatures. In the event of a gas leak, or general wear, the reliability of the gas spring is eliminated and other means must be used to maintain the door in the open position. The rear door of a mini-van can weigh upwards of 100 pounds, and the doors on full sized vans and trucks can be substantially heavier. A door's unexpectedly coming down can cause a substantial amount of physical damage to anyone who is hit. Replacement of the gas springs is expensive, and, in some instances, may not be warranted.

Several patents have issued which have addressed the problem of the failure of the gas spring props, among them U.S. Pat. No. 4,596,383 to Howard. These patents, however, have solved the problem through the addition at the time of manufacture of an ternal locking device. Although a good safety feature, the external locking device does not address the problem of the millions of cars which currently do not have the external locks. Additionally, this is a feature which is either initially placed on cars at the time of manufacture or added separately at a later date.

The instant invention overcomes the problems of the prior art by providing a easy-to-use, inexpensive add-on device to lock the gas springs in the desired position.

BRIEF DESCRIPTION OF THE DRAWINGS

The advantages of the instant disclosure will become more apparent when read with the specification and the drawings, wherein.

SUMMARY OF THE INVENTION

The present invention features a retaining device for locking a pistons that has a retractable sliding arm. The retaining device has a first ring portion having interior, exterior, and two end surfaces. Each of the end surfaces has a connecting means. A receiving area for a holding means extends from proximate the midpoint of the interior surface to the exterior surface of the first ring portion. The holding means, is sized to permit it to be threaded into the receiving area of the first ring portion. In operation, a screw or bolt having a Rockwell hardness of at least RC-45-53 with a concave end is preferred. A handle attaches to one end of the holding means. Preferably, the handle is L shaped with a hexagonal cross section.

The second ring portion also has interior, exterior, and two end surfaces. Each end surface of the second ring portion also has a connecting means.

As assembled, the connecting means of the end surfaces of the first ring portion attach to the connecting means of the end surfaces of the second ring portion, forming a collar. The connecting means of the first ring portion are a pair of threaded holes, extending from the interior surface through to the exterior surface, sized to accept screws, bolts, or other fastening means. The second ring portion is configured to allow the screw or bolt heads to fit flush with or below the exterior surface. The connecting means are preferably configured to receive hexagonal tightening means. The handle configured for tightening the connecting means. Alternatively, the connecting means of the retaining device are a pair of protruding members and a pair of receiving members, which interlock to form a pair of dovetail joints when assembled. This type of connecting means may further include other fastening means, as mentioned above.

The retaining device may be configured so that the second ring portion has an interior surface less than that of the first ring portion.

The retaining device may also include a bushing which fits within the interior area of the collar. The bushing also includes a pair of legs configured to overlap the collar.

DETAILED DESCRIPTION OF THE INVENTION

Figure 20:
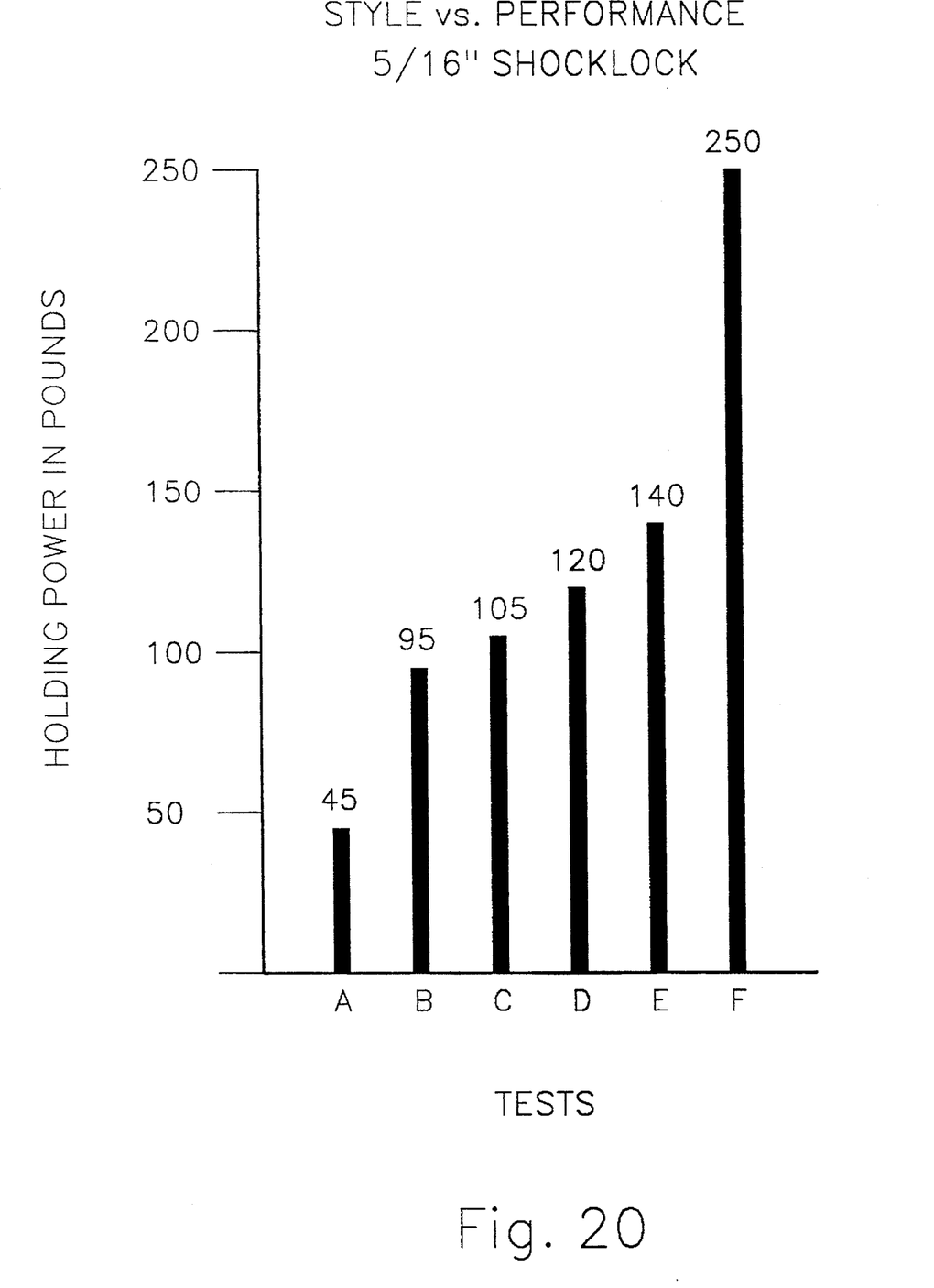
FIG. 20 is a chart of holding power performance, depicting the results achieved for various styles of bolts and screws.
Figure 21:
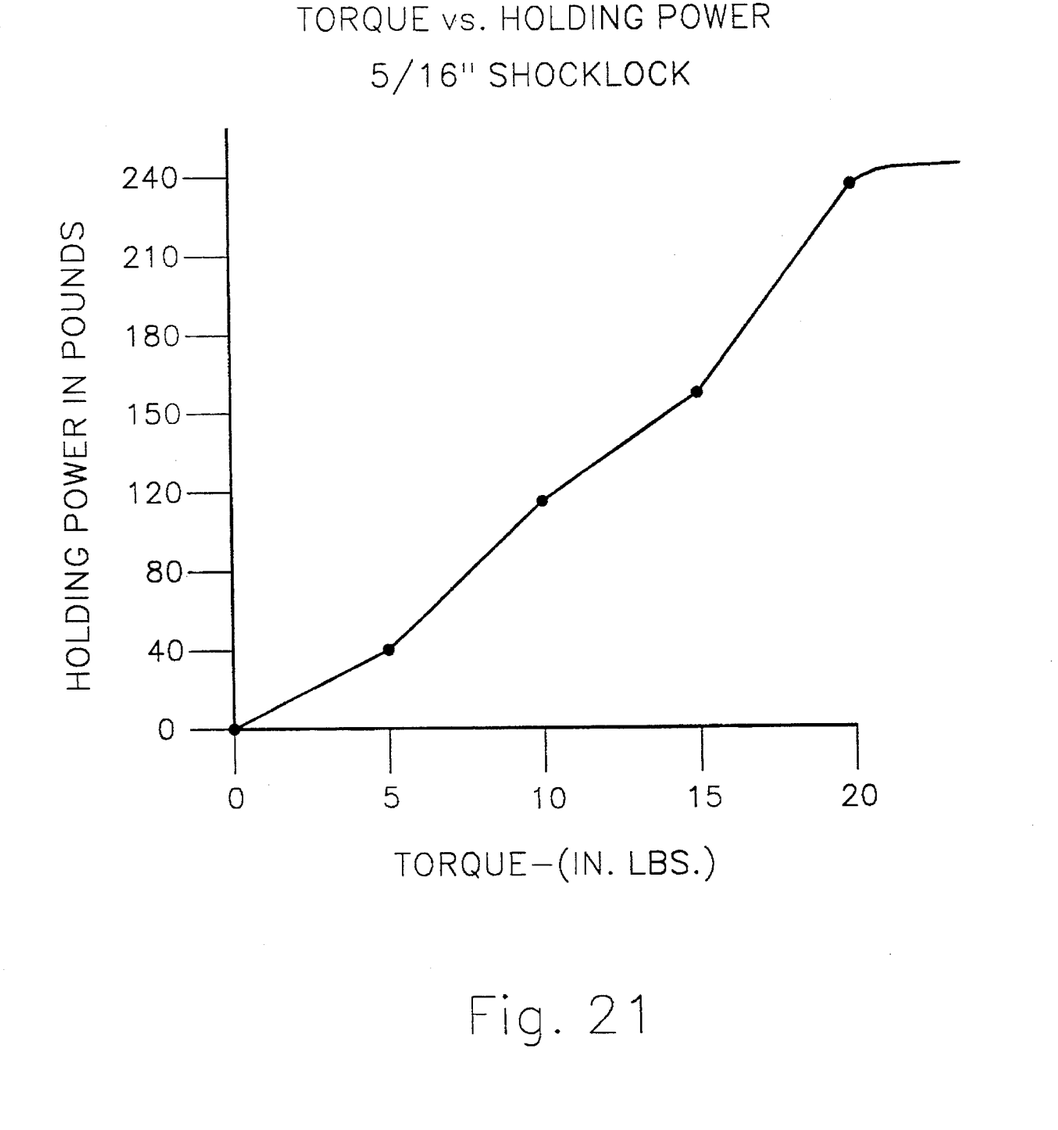
FIG. 21 is a graph of $^{10}/_{32}$ inch screw performance, $^{5}/_{16}$ inch shaft depicting increasing holding power as applied torque increases.

The need for easily applied locks arises from the failure rate on the hydraulic and gas props which is further increased with the decrease in temperature. The failure rate is compounded with the age of the unit in combination with lower temperatures. The charts illustrate the performance rate vs. temperature of new, FIG. 20, 5 year old FIG. 21, and 10 year old, FIG. 22, gas props.

Figure 1:
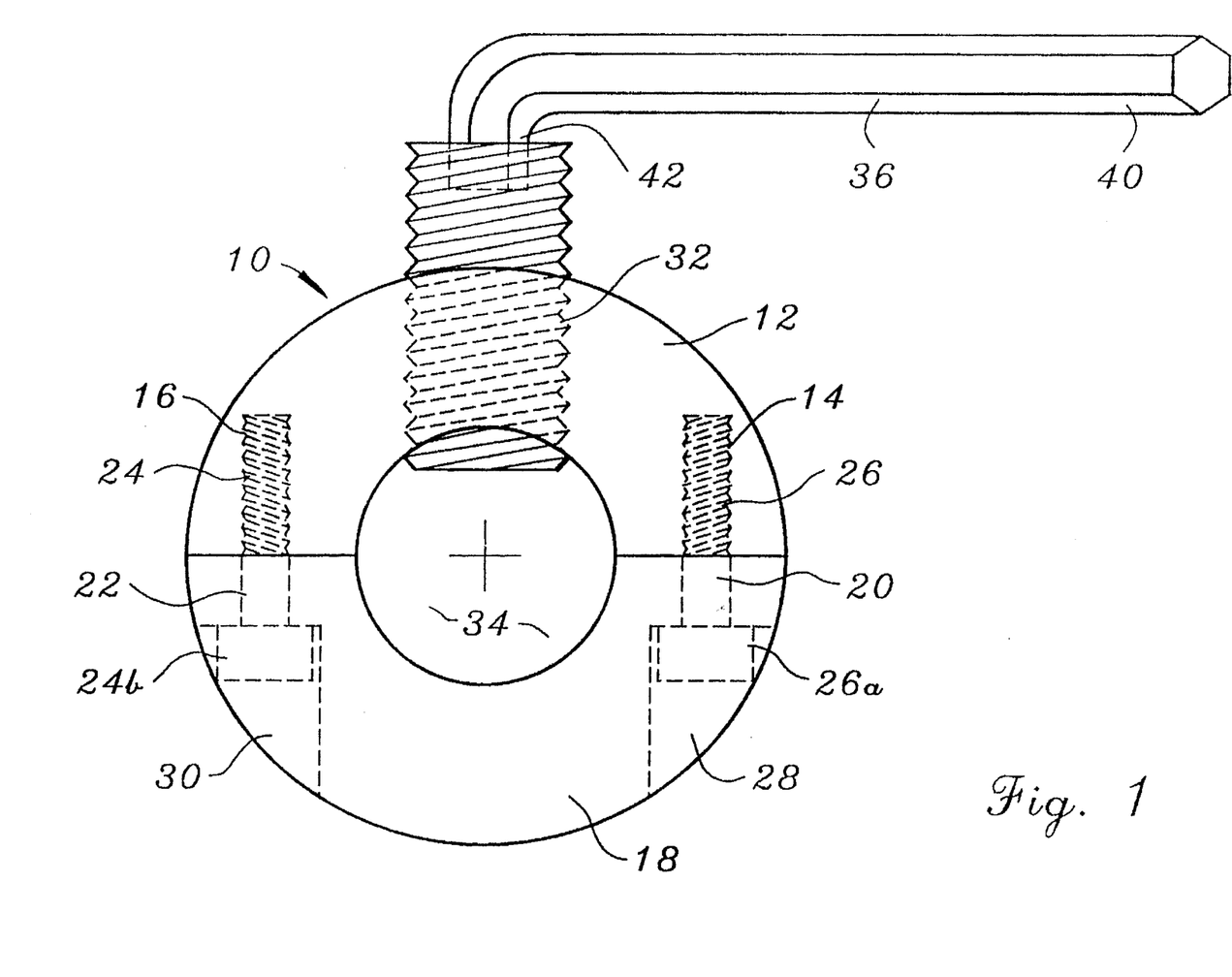
FIG. 1 is a front view the assembled collar lock of the instant invention.

FIG. 1 illustrates the preferred embodiment of the assembled collar lock 10. The collar lock 10 can be used on the shaft of gas support props or hydraulic pistons to support auto hoods, trunks, truck cap, and rear and side doors, and can also be used as an improved lock for screen doors. The standard split-ring collar can be purchased as an off-the-shelf item. The split-ring collar requires the center area to be re-drilled, taking the interior area from the elliptical shape of the original production to the required circular interior. Alternatively, bushings or shims can be used to create the circular interior, thereby replacing the bore operation and reducing the production costs. The bushings and shims are discussed in detail further herein. The original split collar also requires tapping a set screw hole, as described further herein. The collar lock 10 is a two-piece, donut-shaped unit which is retained in the circular shape by screws 24 and 26. When separated, the collar lock 10 is formed of two horseshoe units, the screw-receiving portion 12, and the screw-insert portion 18. The exterior diameter of the collar lock 10 is approximately 19 mm. The thickness of the collar lock 10 is variable and not as critical as the diameter, although the collar lock 10 cannot be so thick as to interfere with the functioning of the gas spring prop. In the assemble state, the collar lock 10 has a center area 34 for receiving the piston arm. The dimension of the center area 34 is slightly greater, approximately 0.3 to 0.5 mm, than the piston arm to allow the collar lock 10 to slide along the arm. The screw-receiving portion 12 is tapped along its flat portion to form screw-receiving areas 14 and 16. The screw-insert portion 18 is initially drilled to form insert areas 28 and 30 and then tapped to form screw-receiving areas 20 and 22. The insert areas 28 and 30 are optimally drilled to allow the screws 24 and 26 to be recessed within the screw-insert portion 18. Dependent upon the manufacturer's desired profit margin, this step can be eliminated. The depth and width of the insert areas 28 and 30 must be slightly greater than the screw heads 24a and 26a to prevent friction. The length of the screw-receiving areas 14 and 16 in the screw-receiving portion 12 must be of a length equal to that of the shaft of the screws 24 and 26, thereby allowing the screws 24 and 26 to recess completely within the screw-insert portion 18. The screws 24 and 26 are preferably configured to receive an Allen wrench, however any type of screw head can be used. The center of the semi-circular periphery of the screw-receiving portion 12 is tapped through to the center area 34 at approximately the center point, to receive the set screw 32. The set screw-receiving area 38 must be tapped to exactly receive the set screw 32. The set screw 32 must be as centered as possible to provide the maximum hold. If the set screw-receiving area 38 is off-center, the set screw 32 does not come in direct contact with the piston arm, thereby compromising the hold. The set screw 32 must have a shaft length which allows the set screw 32 to extend into the center area 34 when tightened. The set screw 32 has affixed to one end an Allen wrench 36, which is preferably dimensioned to correspond to the screw heads 24a and 26a. The handle portion 40 of the Allen wrench 36 requires a length of approximately 1¼ inches or less in order to allow for closure of the piston and door as well as storage in the vehicle when closed. The leg 42 of the Allen wrench 36 can vary depending upon use. The recommended length for the leg 42 is approximately ⅜ inch for use with pistons and can have a greater leg length when being used with other installations. The Allen wrench 36 can be welded, soldered, or glued to the set screw 32 to provide a one piece unit. The Allen wrench 36 and the set screw 32 can be left as individual units; however, the one-piece unit is preferable for convenience. It is preferred to use an Allen wrench 36 as a handle as it provides dual usage in tightening the screws; however, any configuration can be used. The L-shape provided by the Allen wrench 36 provides the leverage required for tightening the set screw 32; however, as discussed further herein, other handle configurations can be used.

The set screw 32 must be manufactured with a Rockwell hardness of at least RC-45-53 to provide the reliability required. The machine screws D, E and F below all equaled the RC-45-53 hardness requirement. The set screw 32 actually cuts into the piston arm to provide a greater grip and prevent sliding. The ability to cut into the piston arm prevents the need to over-tighten the set screw 32. Failure of the set screw 32 will cause failure of the entire unit, thereby allowing the units being held to fall, with possible injury resulting. The ¹⁰⁄₃₂ inch diameter machine screw provides a sharper cut into the arm of the piston, providing greater hold at higher pressures. The ¼ inch diameter does not hold as well, nor does it cut into the piston arm as well. The following chart indicates the holding power of six varied set screws on a ⁵⁄₁₆"/8 mm shock shaft. The standard torque use was 25 in/lb. The following bolts/screws were used in the testing indicated in FIG. 23:

A=Brass ¼—20 thread screw

B=Grade 5 Bolt ¼—20pointed

C=Grade 5 bolt ¼—20cupped

D=¼×20cupped machine screw (RC-45-53)

E=#10×24 cupped machine screw (RC-45-53)

F=#10×32 cupped machine screw (RC-45-53)

The torque vs. holding power is illustrated in the graph of FIG. 24. The set screw is shown tightened at various levels of torque, demonstrating the increased holding power in pounds as the set screw is tightened. Five inch pounds of tightening holds 40 pounds; 10 inch pounds of tightening holds 115 pounds; 15 inch pounds of tightening 155 pounds, etc.

Figure 2:
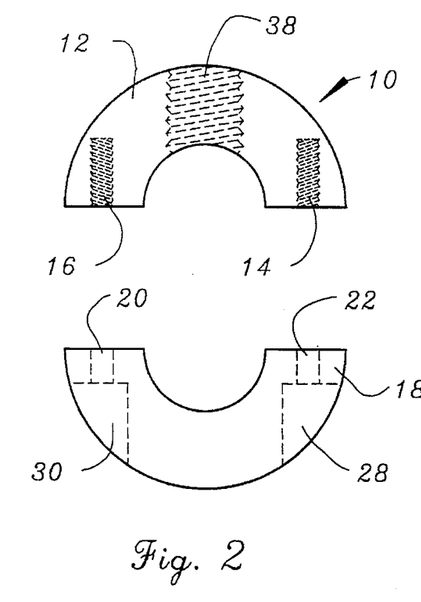
FIG. 2 is a front view of the unassembled collar lock of FIG. 1.
Figures 3, 4:
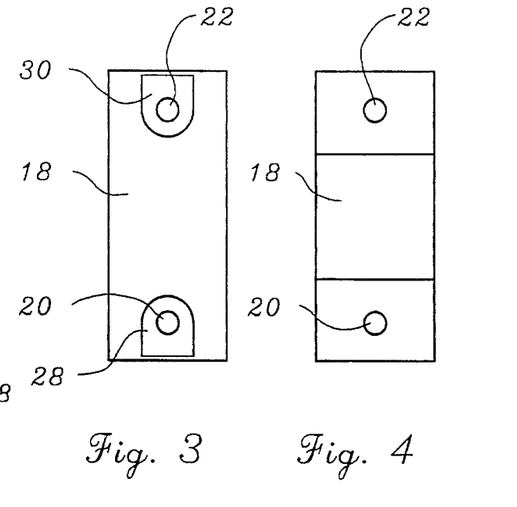
FIG. 3 is a top-end view of the first half of the unassembled collar lock.
FIG. 4 is a bottom-end view of the first half of the unassembled collar lock.
Figures 5, 6:
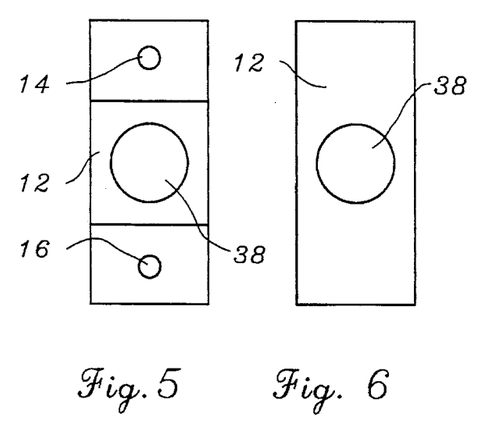
FIG. 5 is a top-end view of the second half of the unassembled collar lock.
FIG. 6 is a bottom-end view of the second half of the unassembled collar lock.

The unassembled collar lock 10 is shown in FIG. 2 wherein the screw-receiving portion 12 and the screw-insert portion 18 are separated. It is in this unassembled state that the collar lock 10 is placed on the piston arm 82 (FIG. 8) and then screwed together, as described further herein. The end views of the screw-receiving portion 12 and the screw-insert portion 18 are illustrated in FIGS. 3, 4, 5 and 6. The insert areas 28 and 30 are shown in FIG. 3, with the screw-receiving areas 20 and 22 extending therefrom. The opposite side, FIG. 4, shows the exiting side of the screw-receiving areas 22 and 20. The set screw-receiving area 38 in the screw-receiving portion 12, FIGS. 5 and 6, is shown extending through the screw-receiving portion 12. As shown, the screw-receiving areas 14 and 16 extend only part-way through the screw-receiving portion 12.

Figure 7:
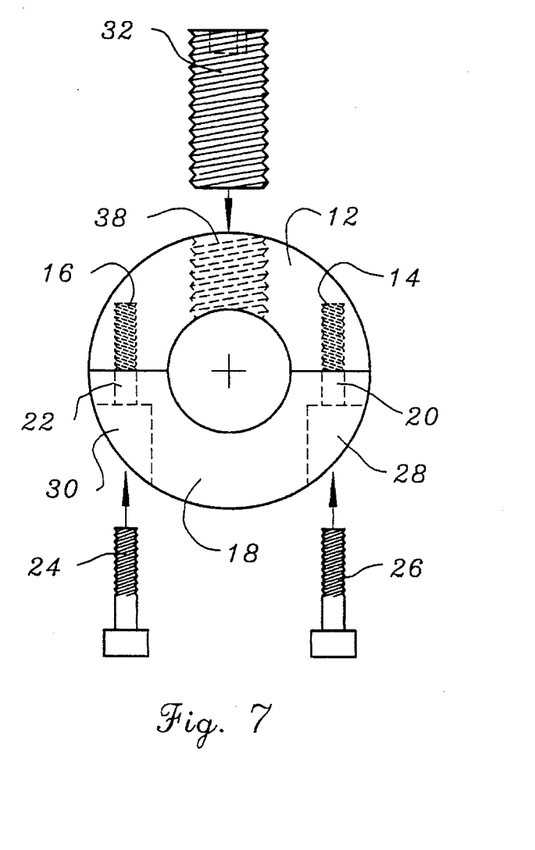
FIG. 7 is a front view of the assembly of the collar lock.

In FIG. 7 the screw-receiving portion 12 and screw-insert portion 18 have been placed together, ready to receive the screws 24 and 26. The screws 24 and 26 are inserted into the insert areas 28 and 30 until contact is made with the screw-receiving areas 20 and 22. The screws 24 and 26 are tightened, engaging with the tapped screw-receiving areas 20 and 22 and the screw-receiving areas 14 and 16. The screws 24 and 26 are tightened, securing the screw-receiving portion 12 and the screw-insert portion 18 and creating a circular configuration. The set screw 32 is tightened to extend into the center area 34 an amount to lock the collar lock 10 onto the piston arm 82, preventing the piston arm 82 from sliding into the piston body 86.

Figure 8:
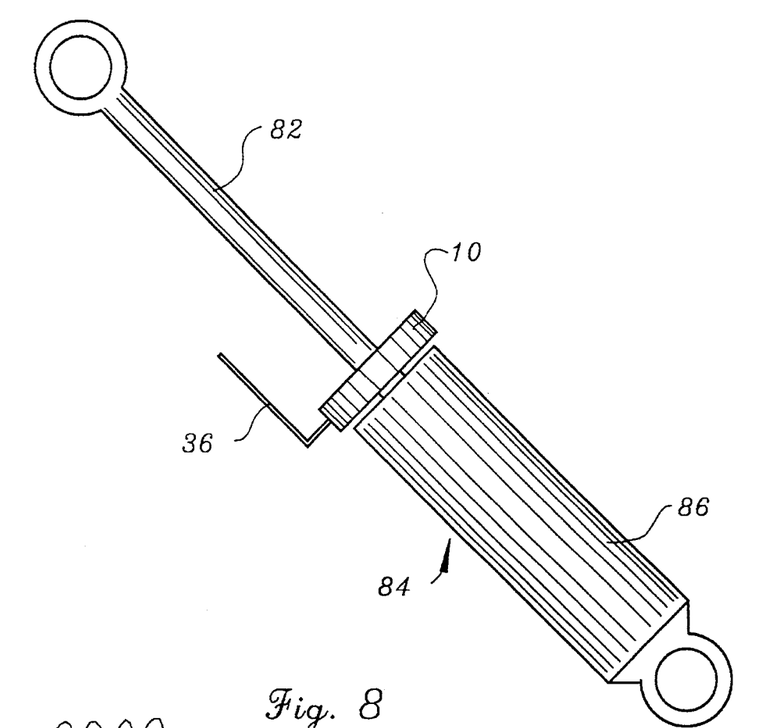
FIG. 8 is a side view of the collar lock applied to a piston.

In FIG. 8 the collar lock 10 has been placed on the piston arm 82. The collar lock 10 is placed on the piston arm 82 while the piston 84 is in the closed position. The screw-receiving portion 12 and the screw-insert portion 18 are placed around the piston arm 82 and the screws 24 and 26 tightened to prevent the screw-receiving portion 12 and the screw-insert portion 18 from separating. The door, or other unit, is placed in the desired position and the collar lock 10 slid to a position adjacent the piston body 86. The Allen wrench 36 is tightened until the set screw 32 grabs the piston arm 82, preventing the collar lock 10 from moving and, subsequently, the piston arm 82 from sliding into the closed position.

Figure 9:
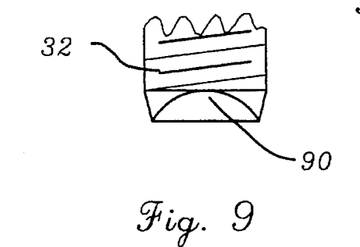
FIG. 9 is a cut-away side view of the bottom of the set screw for use with the instant invention.

In FIG. 9, the preferred end of the set screw 32 is clearly shown in a cross view. The center of the set screw 32 has been drilled out to form a cup area 90. The cup area 90 has a diameter only slightly less that the diameter of the set screw 32, thereby forming a cutting edge which can dig into the steel, of the piston arm 82. The cup area 90 within a screw shaft is known in the prior art. As an alternative, the screw can have a standard point, such as a sheet metal screw. The pointed screws, however, do not retain their point and rapidly wear, thereby requiring continual replacement.

Figure 10:
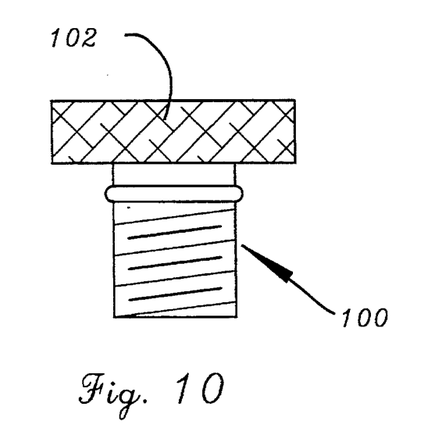
FIG. 10 is a side view of an alternate set screw for use with the instant invention.
Figure 11:
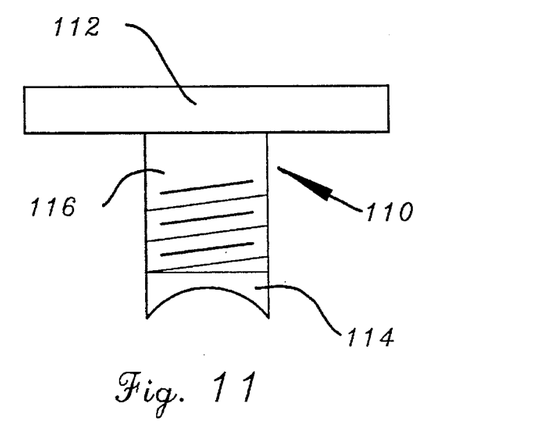
FIG. 11 is a side view of an additional set screw for use with the instant invention.

FIGS. 10 and 11 illustrate alternate embodiments to the set screw 32. The set screw 100 of FIG. 10 is provided with a round, knob-type head 102 with which to tighten the set screw 100. This can be a bolt-type screw with any one of a number of screw heads, as well known in the prior art. The set screw 110 in FIG. 11 is a T-shape with a cross-bar handle 112. The cross-bar handle 112 provides additional leverage over the set screw configuration of FIG. 10. This configuration, however, is more complex to manufacture than the L-shaped handle heretofore described. A shim 114 has been added to the end of the shaft 116. The shim 114 provides an additional cutting edge to increase the ability of the set screw 110 to hold the collar lock in place without slippage.

Figure 12:
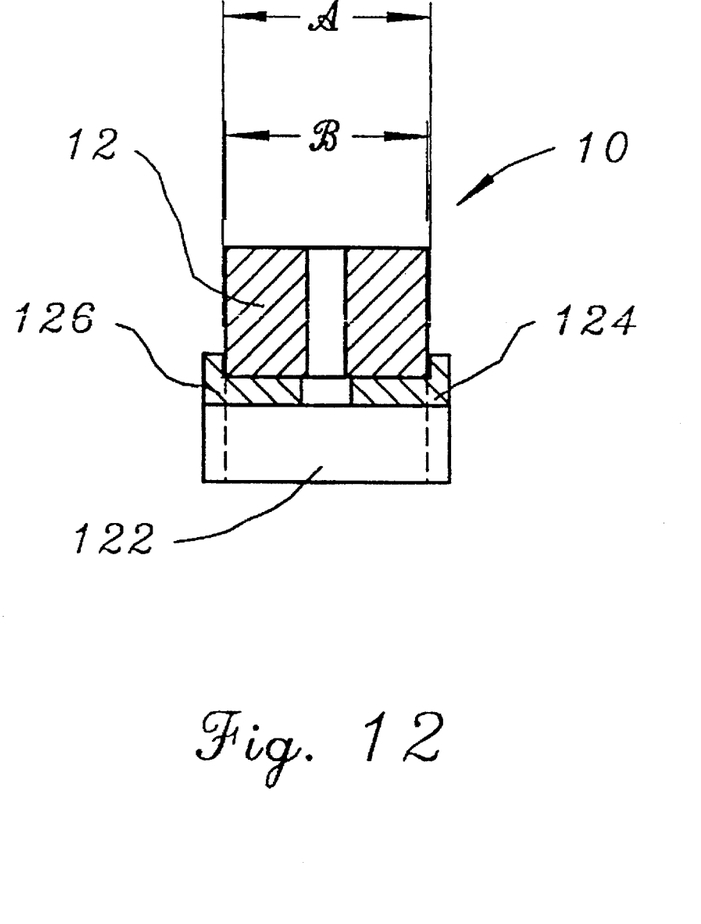
FIG. 12 is a cut-away side view of the bushing for the collar lock of FIG. 1.

The standard pistons, or gas lift props, are manufactured in three primary sizes. In order to adapt to the size variations, bushings 122 can be added to the interior of the collar lock 10 to reduce the size, as shown in FIG. 12. The bushings 122 are manufactured in two sizes, 8 mm and 6 mm. The center area 34 of the collar lock 10 is bored at just over 10 mm. Through the addition of the bushing 122, the center area 34 of the collar lock 10 can be reduced to either the 8 mm or 6 mm sizing. The bushing 122 is a C-shaped unit which fits within the center area 34 of the collar lock 10. The bushing 122 is held in place during assembly of the collar lock 10 through the friction created by sliding leg 124 and leg 126 over the screw-receiving portion 12 and the screw-insert portion 18. The distance A of the bushing 122 is slightly greater than the distance B of the collar lock 10, thereby providing a mild friction fit. Although the friction fit is not critical to the functioning of the collar lock, the assembly is substantially more convenient. One half of the bushing 122 must be drilled to allow the set screw 32 through from the collar lock 10.

Figure 13:
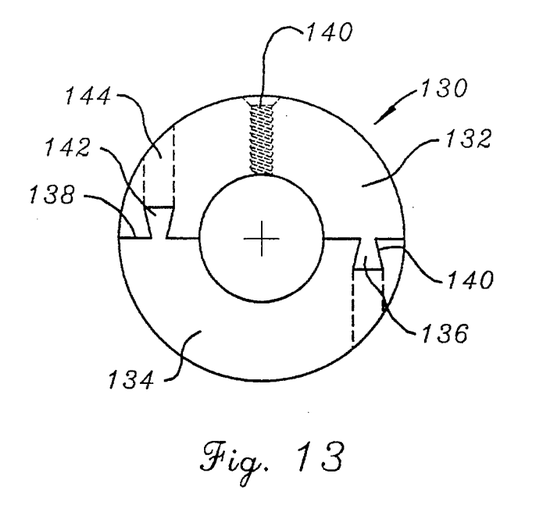
FIG. 13 is an alternate embodiment of the collar lock of the instant invention.

An alternate embodiment to the collar lock 10 is shown in FIG. 13, wherein rather than using screws 24 and 26 to lock the dovetail first portion 132 and the dovetail second portion 134, dove tails are provided. The dovetail first portion 132 and the dovetail second portion 134 are mirror images, each having a dovetail-receiving area 138 and a dovetail 136. The dovetail 136 is slid into the dovetail-receiving area 140 and dovetail 142 is slid into dovetail-receiving area 138. The sizing between the dovetails 142 and 136 and the dovetail-receiving areas 138 and 140 preferably provide a friction fit, thereby keeping the dovetail first portion 132 and the dovetail second portion 134 locked together. As an alternative, the dovetail first portion 132 can be drilled with a retaining screw-receiving area 142 to further secure the two units together. The first portion 132 is tapped with a set screw-receiving area 144 to allow the dovetail collar 130 to be locked in the appropriate position, as heretofore noted.

Figures 14, 15:
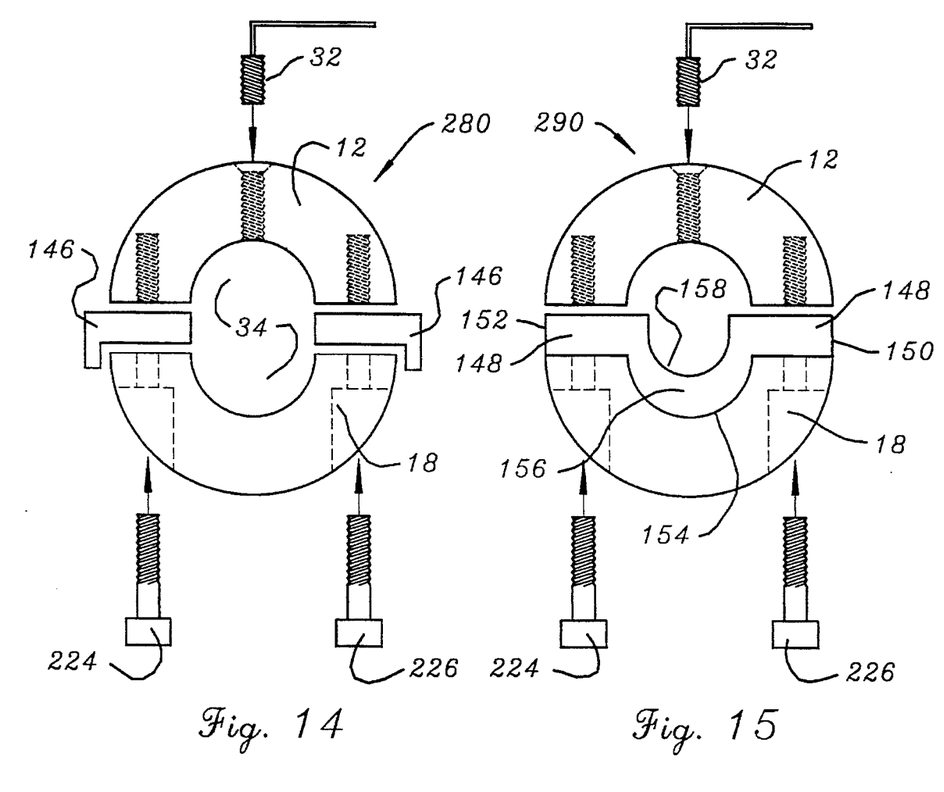
FIG. 14 is a front view of the collar lock as assembled with the L-spacers.
FIG. 15 is alternate embodiment of the bushing of the instant invention.

FIG. 14 illustrates the L-spacers 146 which are placed between the the screw-receiving portion 12 and the screw-inset portion 18. The L-spacers 146, as illustrated herein, are provided with a lip which prevents slippage of the L-spacer 145 toward the center area 34 of the collar lock 10. Alternatively, the spacers can be a rectangular piece which does not extend beyond the collar lock 10. The L-spacers 146, at a 0.060 thickness, will re-center the football shaped bore without the necessity of re-boring the center. The 0.060 thickness of the L-spacer 145 re-centers the collar lock 280 as described herein for gas spring props; however, for other applications, such as hydraulic jacks, as the size of the collar lock increases, the flanges must also increase accordingly. The L-spacers 146 are tapped or bored in order to receive screws 224 and 226 which hold the L-spacers 146 in position by securing the L-spacers 146 between the the screw-receiving portion 12 and the screw-insert portion 18 with screws 224 and 226. The screws 224 and 226 have a greater length than screws 24 and 26 in order to fully engage the screw-receiving portion 12.

An alternate to the bushing 122 is illustrated in FIG. 15. The flange 148 has a semi-circular body 156 which has an outer-periphery 154 slightly less than the interior of the screw-insert portion 18. The flange 148 is provided with a pair of spacers 150 and 152 which extend from the semi-circular body 156 of the flange 158. The spacers 150 and 152 are either tapped or bored to allow for the screws 224 and 226 to pass through. The interior surface 158 of the flange 148 has diameter less than that of the screw-insert portion 18, thereby allowing for adjustability in the interior area of the collar lock 280. The piston arm fits into the closely dimensioned interior surface 158 and is secured there by set screw 32. This prevents any lateral movement within the larger area of the screw's receiving portion 12. This adjustability allows the screw-receiving portion 12 and the screw-insert portion 18 of the collar lock 10 to be used with piston arms which have a diameter less than the interior diameter of the basic collar lock 10. The interior surface 158 of the flange 148 can be manufactured in several diameters to accommodate various piston arms.

Figure 16:
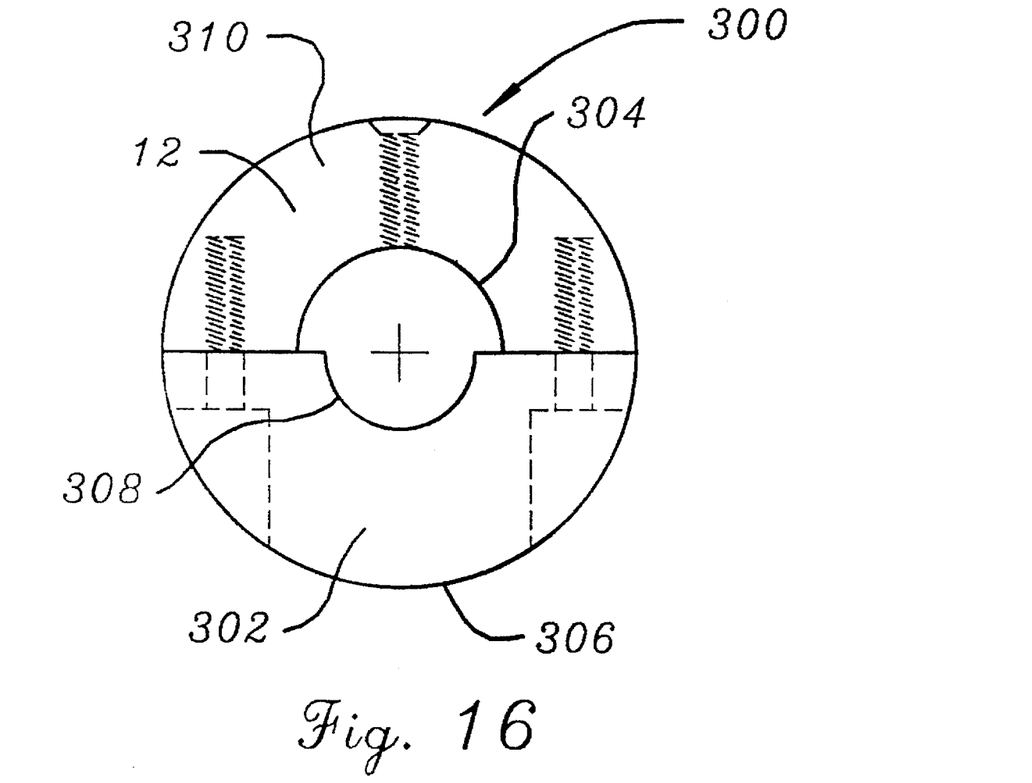
FIG. 16 is an alternate embodiment of the collar lock oft the instant invention suitable for use on different sized prop arms.
Figure 17:
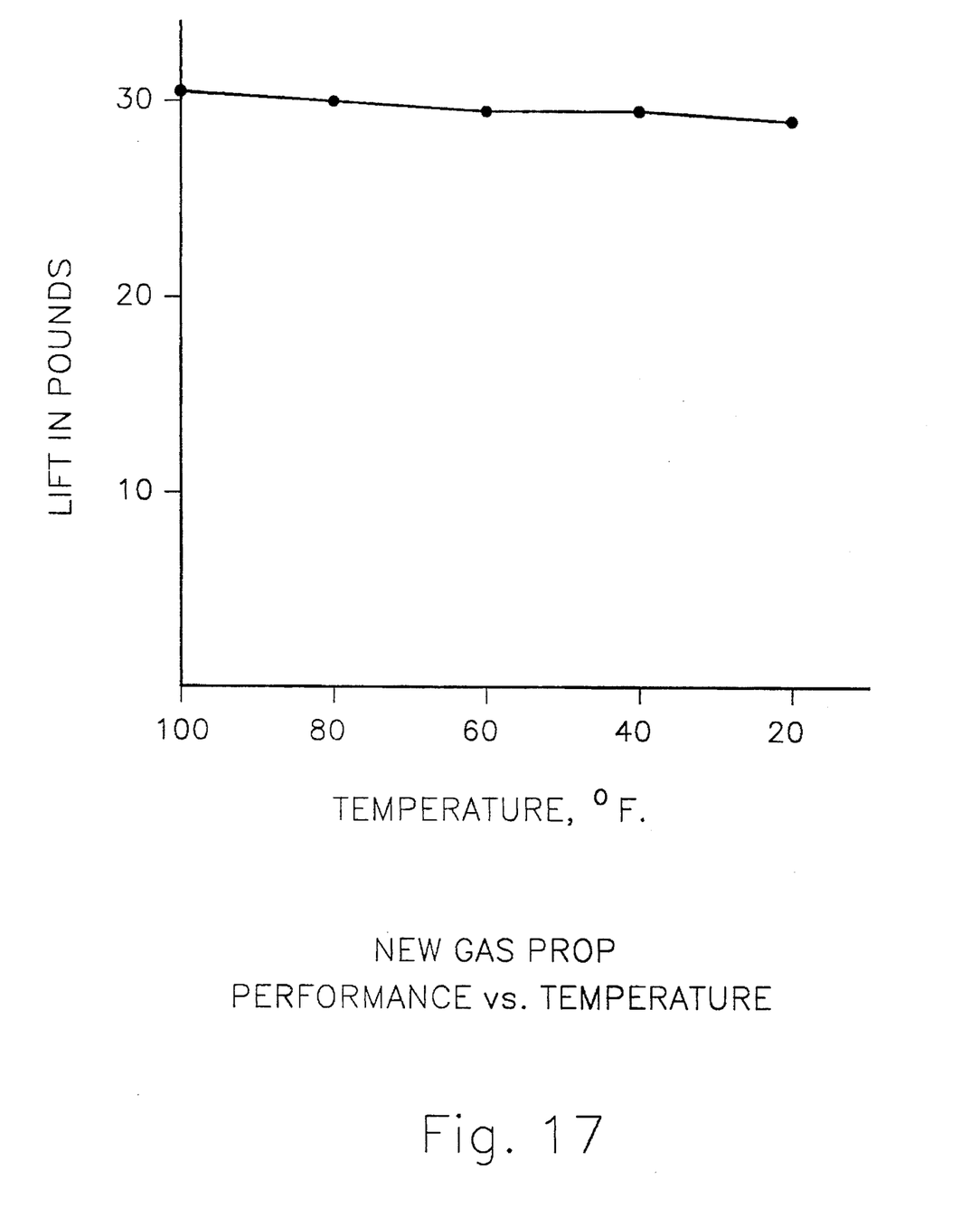
FIG. 17 is a graph of hydraulic prop performance, depicting the properties of new gas.
Figure 18:
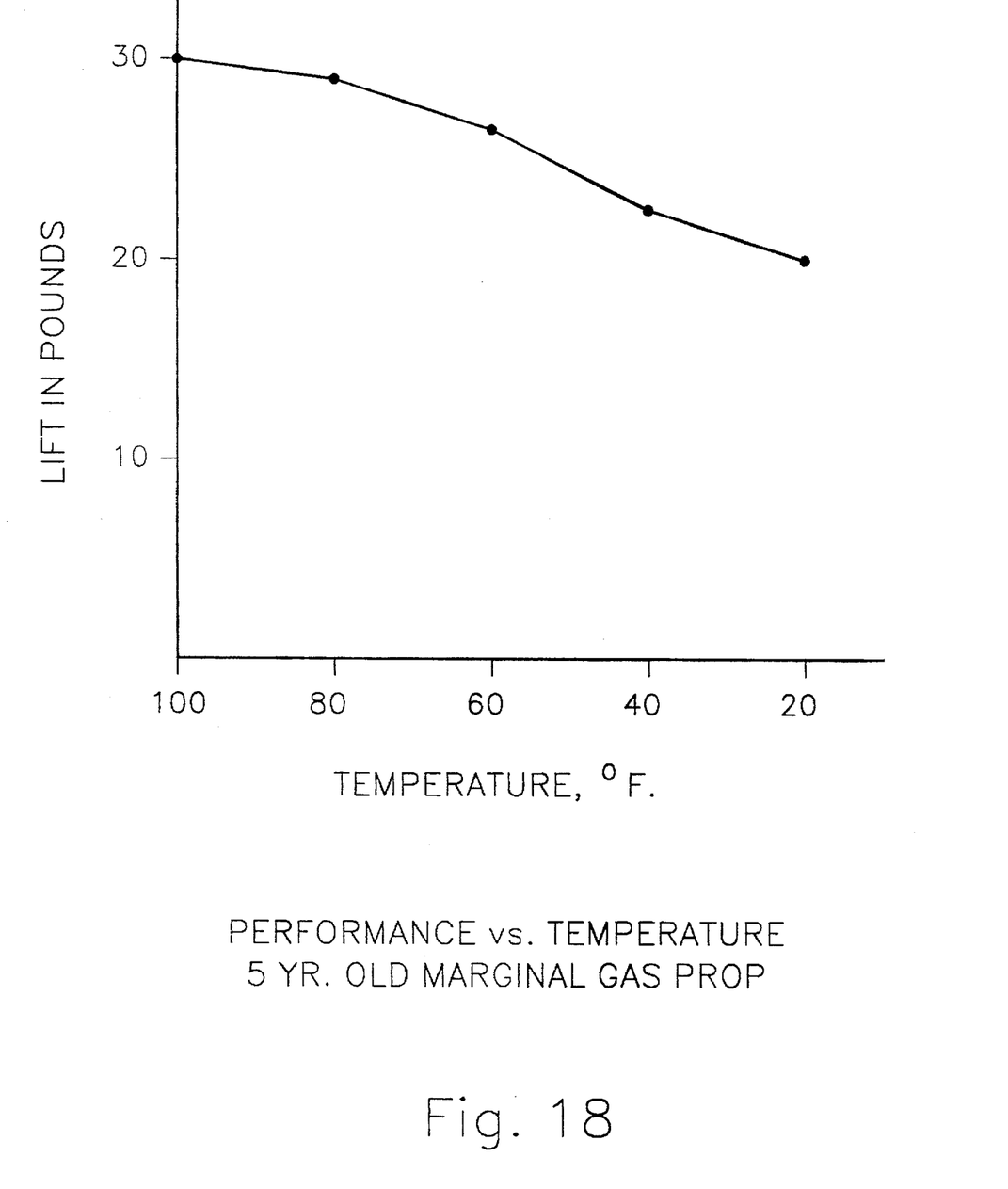
FIG. 18 is a graph of hydraulic prop performance, depicting the properties of five year-old marginal gas.
Figure 19:
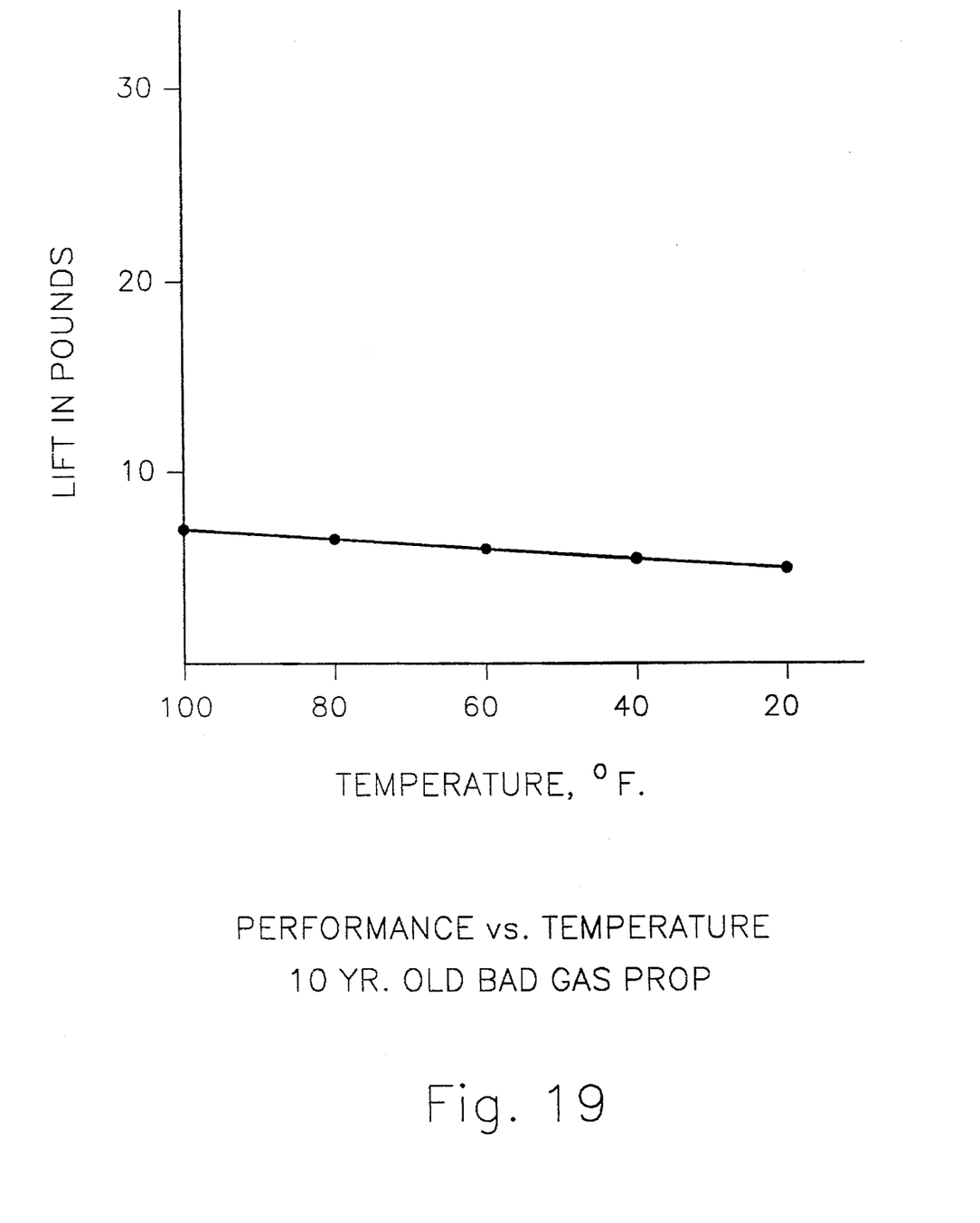
FIG. 19 is a graph of hydraulic prop performance, depicting the properties of ten year-old marginal gas.

An alternative embodiment to the collar lock 10 is illustrates in FIGS. 16 and 17 as collar look 300. The collar lock 300 uses the screw-receiving portion 12 of the collar lock 10 with a screw-insert portion 302. The screw-insert portion 302 has an exterior diameter 306 which is equal to the exterior diameter 310 of the screw-receiving portion 12. The interior diameter 304 of the screw-insert portion 302 has a diameter less than that of the interior diameter 308 of the screw-receiving portion 12. The piston arm sits within the interior diameter 304 of the screw-insert portion 302 and is locked in place as previously described herein.

The addition of a screw-insert portion, which allows for small diameter piston arms, can be incorporated in the embodiment disclosed in FIG. 13.

The dimensions provided herein are suggested for use with gas props, etc. provided on trucks, automobiles, etc., or with screen door openers. The tolerances on the foregoing dimensions are approximately ½ mm. The collar lock disclosed herein can be made larger to accommodate other applications and the dimensions provided herein are suggest for particular uses and should not limit the scope of the invention. The collar lock can be used on any hydraulic piston or gas prop, or any other mechanism which operates on a slide basis. Hydraulic jacks are an example of an ideal application and would only require dimension changes. The collar lock of the instant invention can sustain weights up to 250 pounds of pressure and can therefore be used for a wide variety of applications.

Although all of the collar lock configurations described above are generally cylindrical in shape, any other geometric configuration can be used providing it meets the constraints imposed by the application.

Since other modifications and changes varied to suit particular operating requirements and environments will be apparent to those skilled in the art, the invention is not considered limited to the examples chosen for the purposes of disclosure, and covers all changes and modifications which do not constitute departures from the true spirit and scope of this invention.

GLOSSARY

Collar lock 10
Screw-receiving portion 12
Screw-receiving area 14
Screw-receiving area 16
Screw-insert portion 18
Screw-receiving area 20
Screw-receiving area 22
Screw 24
Screw 26
Screw head 24a
Screw head 26b
Insert area 28
Insert area 30
Set screw 32
Center area 34
Allen wrench 36
Set screw-receiving area 38
Handle portion 40
Leg 42
Piston arm 82
Piston 84
Piston body 86
Cup area 90
Set screw 100
Round, knob-type head 102
Set screw 110
Cross-bar handle 112
Shim 114
Shaft 116
Bushings 122
Leg 124
Leg 126
Dovetail collar 130
Dovetail first portion 132
Dovetail second portion 134
Dovetail 136
Dovetail-receiving area 138
Dovetail-receiving area 140
Dovetail 142
Set screw-receiving area 144
L-spacers 146
Flange 148
Spacer 150
Spacer 152
Outer periphery 154
Semi-circular body 156
Interior surface 158
Screw 224
Screw 226
Collar lock 280
Collar lock 300
Screw-insert portion 302
Interior diameter 304
Exterior diameter 306
Interior diameter 308
Exterior diameter 310

What is claimed is:

1. A retaining device kit for locking a piston, said piston having a slidable arm and a body into which said slidable arm retracts, said retaining device kit having:

(a) a first ring portion, said first ring portion having:
    (i) an interior circumferential surface,
    (ii) an exterior circumferential surface,
    (iii) a pair of end surfaces joining said interior and exterior circumferential surfaces at opposite ends of said first ring portion, wherein each end surface comprises a threaded receiving area extending towards said exterior circumferential surface of said first ring portion, and
    (iv) a threaded holding means receiving area, said holding means receiving area extending from said exterior circumferential surface to said interior circumferential surface of said first ring portion;

(b) a plurality of second ring portions, each second ring portion having:
    (i) an interior circumferential surface,
    (ii) an exterior circumferential surface,
    (iii) a pair of end surfaces joining said interior and exterior circumferential surfaces at opposite ends of said second ring portion, wherein each end surface comprises a fastening means insert area extending from each end surface through said second ring portion to said exterior circumferential surface thereof, wherein said interior circumferential surfaces of each second ring portion are of different circumferential dimensions;

(c) a holding means, said holding means having a second end dimensioned to be in threadable connection with said threaded holding means receiving area;

(d) a handle means, said handle means being connected to a first end of said holding means opposite said second end of said holding means; and (e) a pair of threaded fastening means dimensioned to be insertable into said fastening means insert areas of said end surfaces of each of said second ring portions and to be in threadable connection with said threaded receiving areas of said end surfaces of said first ring portion;

so that said end surfaces of said first ring portion may be joined to said end surfaces of each second ring portion to form a collar having an interior area that will vary depending upon the interior circumferential dimension of the second ring portion joined to said first ring portion.

2. A retaining device for locking a piston, said piston having a slidable arm and a body into which said slidable arm retracts, said retaining device having:

(a) a first ring portion, said first ring portion having:
  (i) an interior circumferential surface,
  (ii) an exterior circumferential surface,
  (iii) a pair of end surfaces joining said interior and exterior circumferential surfaces at opposite ends of said first ring portion, wherein each end surface comprises a threaded receiving area extending toward said exterior circumferential surface of said first ring portion, and
  (iv) a threaded holding means receiving area, said holding means receiving area extending from said exterior circumferential surface to said interior circumferential surface of said first ring portion;

(b) a second ring portion, said second ring portion having:
  (i) an interior circumferential surface,
  (ii) an exterior circumferential surface,
  (iii) a pair of end surfaces joining said interior and exterior circumferential surfaces at opposite ends of said second ring portion, wherein each end surface comprises a fastening means insert area extending from each end surface through said second ring portion to said exterior circumferential surface thereof;

(c) a holding means, said holding means having a second end dimensioned to be threadable connection with said threaded holding means receiving area;

(d) a handle means, said handle means being permanently affixed to and integral with said first end of said holding means opposite said second end of said holding means, and having a hexagonal cross-section; and (e) a pair of threaded fastening means each having a head dimensioned to receive said hexagonally cross-sectioned handle means on said first end of said holding means, wherein said threaded fastening means are dimensioned to be insertable into said fastening means insert areas of said end surfaces of said second ring portion and to be in threadable connection with said threaded receiving; areas of said end surfaces of said first ring portion;

so that said end surfaces of said first ring portion may be joined to said end surfaces of said second ring portion to form a collar around said slidable arm of said piston with said threaded fastening means using said handle means to tighten said threaded fastening means, which handle means may then be used to tighten said holding means integral therewith in said holding means receiving area to set said retaining device on said piston arm.

* * * * *